Jan. 21, 1941.   R. G. LE TOURNEAU   2,229,103
TELESCOPING SCRAPER
Filed Feb. 17, 1939   4 Sheets-Sheet 1

INVENTOR
R. G. LeTourneau

ATTORNEY

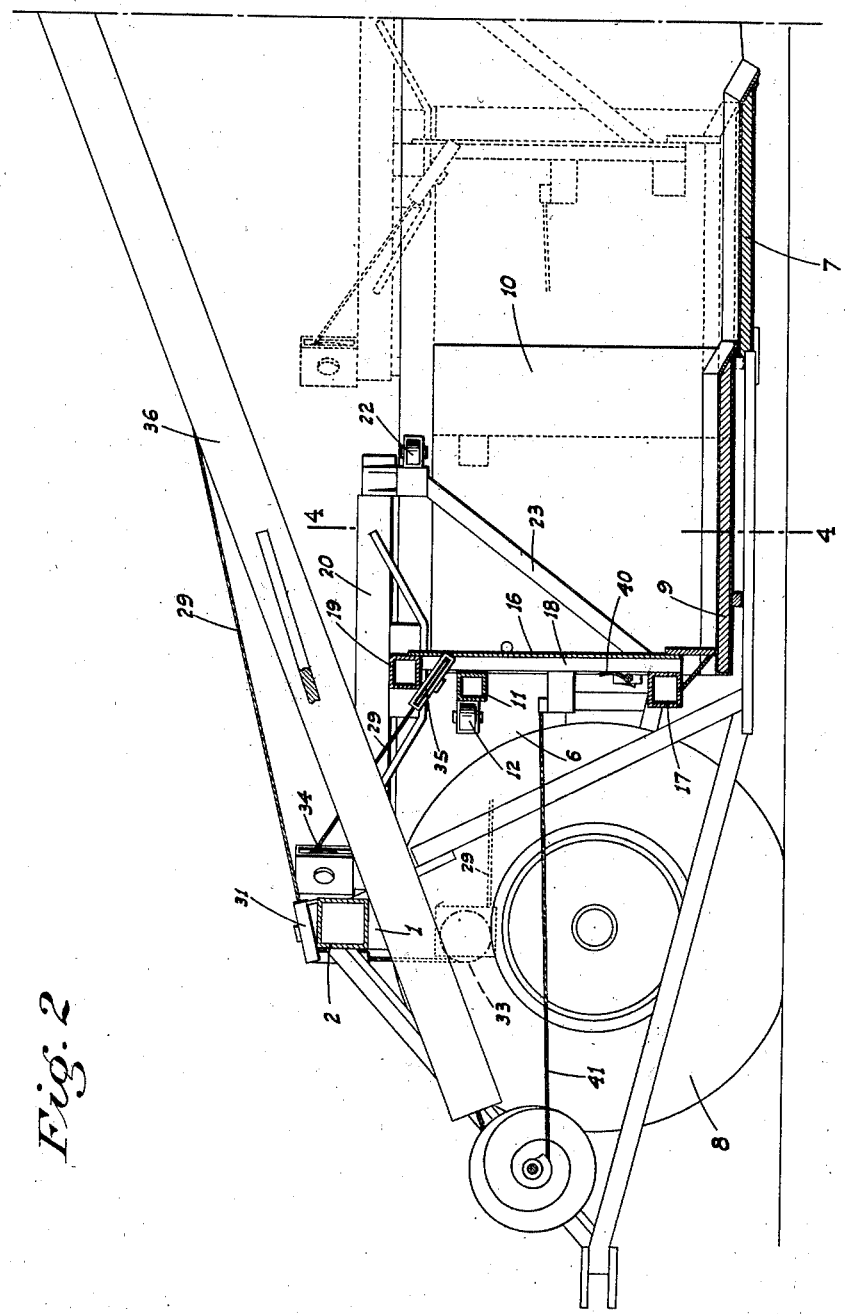

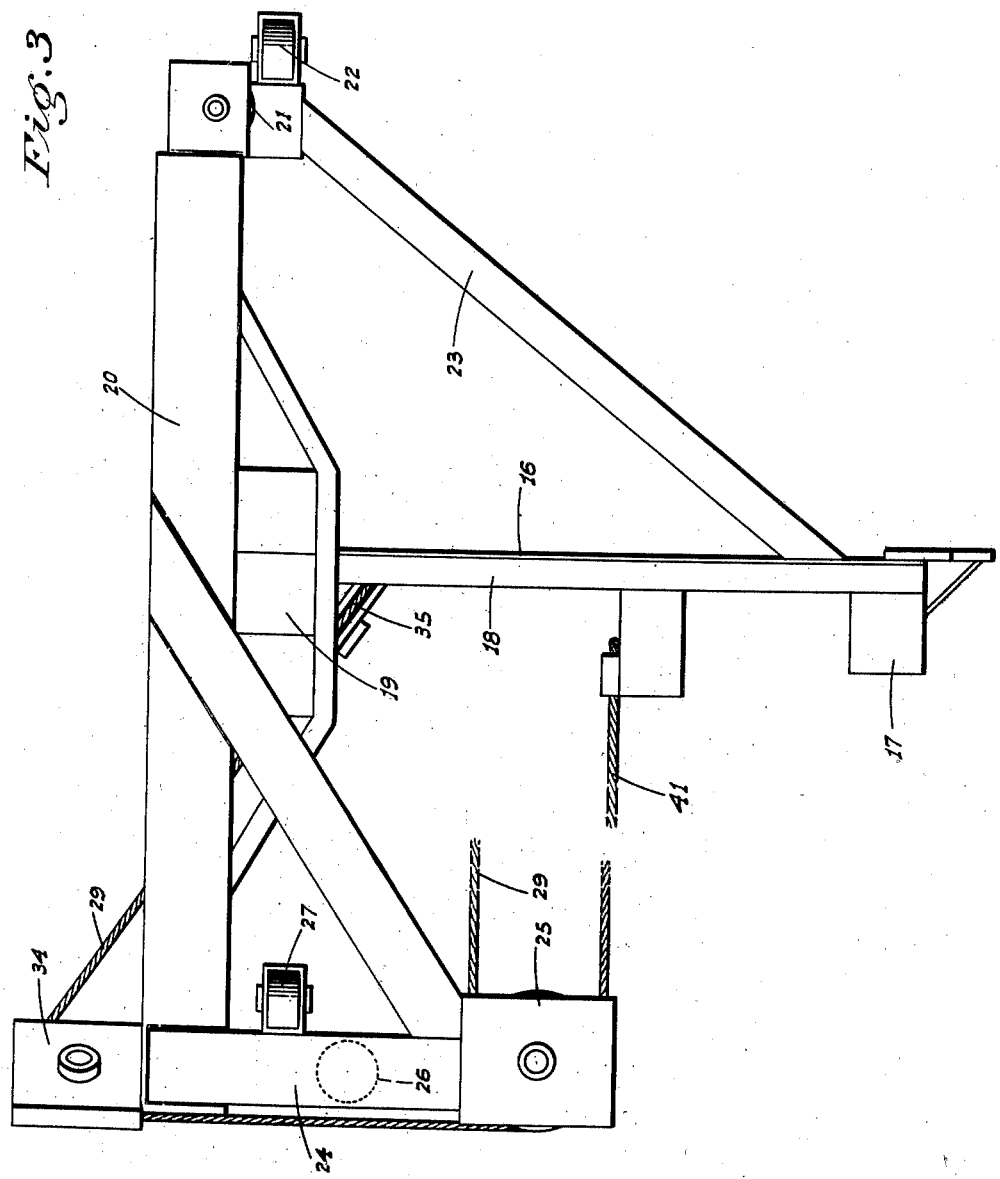

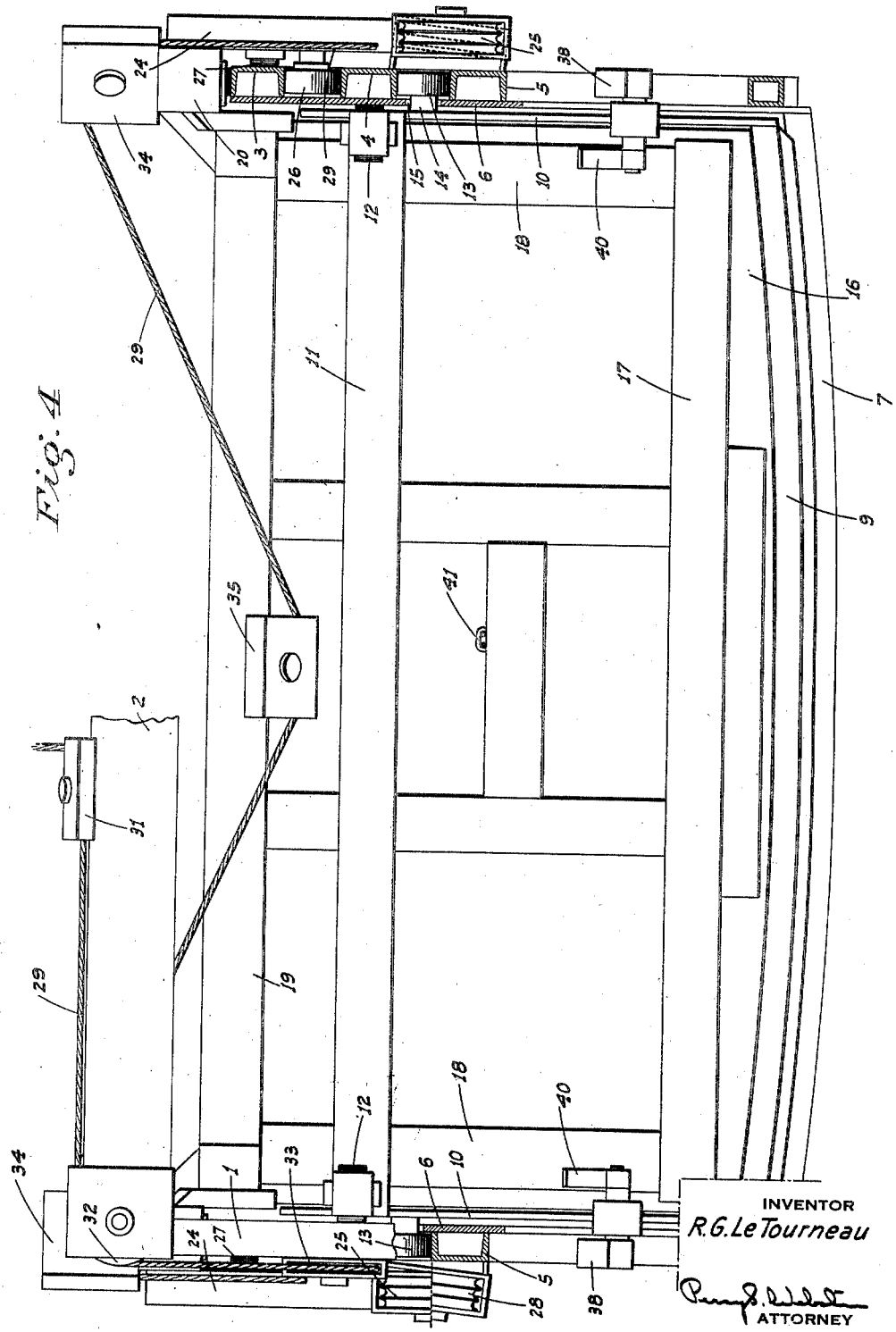

Patented Jan. 21, 1941

2,229,103

UNITED STATES PATENT OFFICE 2,229,103

TELESCOPING SCRAPER

Robert G. Le Tourneau, Peoria, Ill., assignor to R. G. Le Tourneau, Inc., a corporation of California Application February 17, 1939, Serial No. 256,896

9 Claims. (Cl. 37—126)

This invention relates to scrapers of the large capacity telescoping bowl type, and particularly represents improvements over certain features of the scraper shown in my Patent No. 2,112,105 dated March 22, 1938; primarily with respect to the construction and control of the slidable tailgate.

In the previous scraper, the pull cable was applied to the tailgate at such a point that the tailgate supporting carriage tended to bind when the tailgate was being pulled against a heavy load, and rapid wear of the carriage rollers or their bearings, as well as other parts, resulted.

The principal object of the present invention is to eliminate this objectionable feature by constructing the tailgate and applying the pull cable thereto in such a manner that a more direct or right-angle pulling pressure on the dirt engaging portion of the tailgate is had than was previously the case, so that the tendency of the tailgate to tilt back when in contact with a load, and its carriage to tip forwardly and bind, is avoided. A smoother running tailgate unit, with less wear occurring, results.

I have also improved and simplified the form and mounting of the back or sliding bowl of the scraper so that the use of the same rails for the rollers of the tailgate carriage and said bowl is avoided, and the height of said carriage above the main body or frame of the scraper and a corresponding amount of dead weight, may be reduced.

These objects I accomplish by means of such structure and relative arrangement of parts as will fully appear by a perusal of the following specification and claims.

In the drawings similar characters of reference indicate corresponding parts in the several views:

Figure 2 is a similar sectional elevation; the fully advanced position of the tailgate and sliding bowl being shown in dotted lines.

Figure 3 is an enlarged side elevation of the tailgate detached.

Figure 4 is an enlarged transverse section taken substantially on the line 4—4 of Fig. 2 with respect to the body of the scraper but with the tailgate and sliding bowl advanced ahead of said line; a fragmentary portion of the main scraper frame at the rear end and on one side being also shown.

Figure 1:
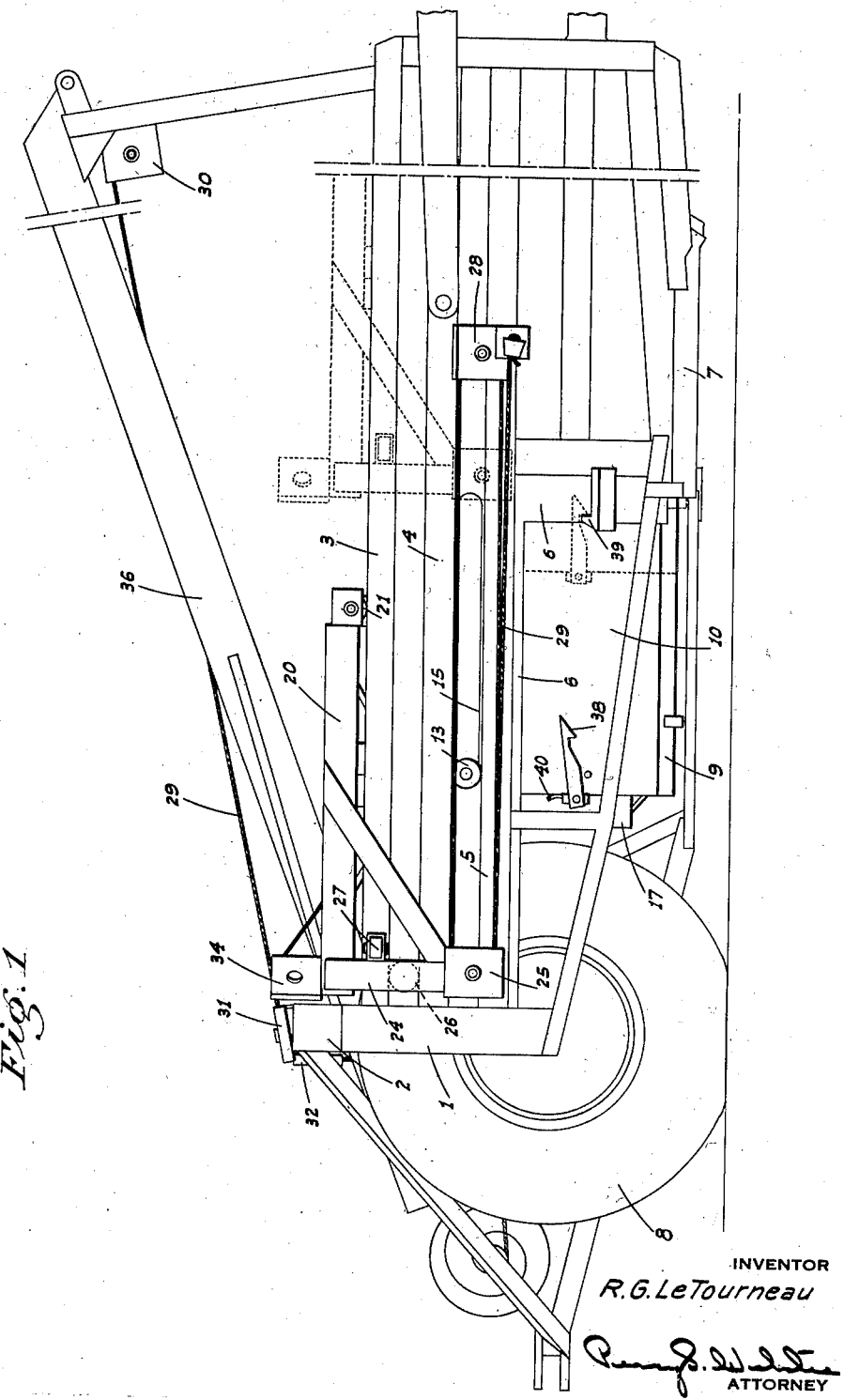
Figure 1 is a fragmentary side elevation of a telescoping scraper emphasizing the new features; the tailgate and sliding bowl being shown in their retracted position.

Referring now more particularly to the characters of reference on the drawings, the main body or framework and its supporting structure is essentially the same as that shown in the previous patent. The framework or body of the scraper includes rear-end side posts 1 connected at the top by a crossbeam 2. Longitudinal and parallel side beams 3, 4 and 5 extend forwardly in vertically spaced relation from the posts 1. These beams are backed by side plates 6 the forward portions of which depend from the lower beams 5 to form the sides of the stationary bowl 7.

The body is supported at the back by wheels 8 disposed between the posts and extending under the crossbeam 2, the posts 1 being substantially centered with the wheels.

The front end of the scraper is supported for vertical adjustment in any suitable manner, as by a swivel wheel draft-truck and connecting arm arrangement such as that shown in the previous patent, and which it is therefore unnecessary to illustrate here.

The back or sliding bowl 9 of the scraper, which cooperates with the front bowl 7, includes side plates 10 fitting between the main side plates 6 and terminating below the top edge of the latter. A crossbeam 11 connects plates 10 at the back and some distance below their top edge. The beam 11 adjacent its ends supports a pair of rollers 12 disposed with their axes vertical and engaging side plates 6. The plates 10, adjacent their rear end, support a pair of laterally projecting rollers 13 which ride the adjacent faces of side beams 4 and 5; the stub shafts 14 of said rollers projecting through longitudinal slots 15 cut lengthwise in plates 6 between said beams 4 and 5. These rollers support the bowl so that at its rear end its bottom is clear of the bottom of the front bowl when fully advanced therein. The blade at the front end of the sliding bowl rests on the front bowl however, so that when said sliding bowl is advanced, a clean scraping of the bottom of the front bowl will be effected.

The scraping pressure is enhanced by reason of the fact that the supporting rollers 13 (about which the sliding bowl may rock) are at the rear end of said bowl, so that practically the entire weight thereof, in addition to the load, is effective to press the blade against the bottom of the front bowl.

Placing the rollers at the back end of the bowl also avoids the need of the slots 15 extending into the side plate area of the fixed bowl where they would be exposed ahead of the sliding bowl and allow dirt to escape.

The movable tailgate unit, which cooperates with the sliding bowl, comprises the tailgate proper and its supporting carriage, and is constructed as follows:

The tailgate itself comprises a vertical plate 16 extending between the bowl plates 10 ahead of the crossbeam 11 and stiffened by a lower crossbeam 17 and uprights 18 behind the plate. The tailgate depends from and is rigid with the crossbeam 19 of the carriage. This crossbeam extends between and is rigidly connected to the longitudinal carriage beams 20 which override the top body beams 3 in clearance relation thereto. The beams 20 at their forward end support rollers 21 riding on the top of beams 3 and other rollers 22 riding against the inner face of side plates 6 adjacent the top. Diagonal braces 23 extend forwardly from the tailgate adjacent the bottom to rigid connection with beams 20 at their forward end.

The tailgate is disposed substantially midway of the length of the carriage and when fully retracted, is just ahead of wheels 8 as shown in Fig. 2. The rear end of the carriage is then adjacent the posts 1 as shown in Fig. 1. In this manner a long and balanced unit, giving excellent stability, may be used without increasing the length of the body over what is in any event necessary.

Rigid with and depending from the carriage beams at their rear end and on the outside of the body are arms 24, which support rigid sheave blocks 25 on their lower end. The arms support rollers 26 riding on the adjacent faces of side beams 3 and 4, and other rollers 27 riding on the outer face of beams 3. The carriage is thus supported adjacent its ends for relatively frictionless movement along the side beams (which are in effect rails) by the rollers 21 and 26, and is prevented from lateral deviation and binding by the rollers 22 and 27.

The sheave blocks 25 are disposed on a level substantially midway between the top of the carriage and the bottom of the tailgate plate and are horizontally alined with fixed sheave blocks 28 mounted on the body ahead of the forward limit of travel of the carriage sheave blocks. It will therefore be seen that with a pull cable 29 extending between the corresponding sheave blocks on each side, a direct forward pull is imparted to the tailgate unit in the horizontal zone of the load engaged by the tailgate itself. The pull on the carriage being at a point back of the resistance or load engaging plane, the tendency of such pull to lift the carriage at its front end and tilt the tailgate forwardly, is offset or counteracted by the tendency of the tailgate to tilt back as it engages the load. Any tendency of the carriage to tilt one way or the other, and the rollers at one end or the other to ride more heavily and wear relatively fast, is therefore eliminated, and a smooth running unit is provided.

In order to utilize a single cable 29 for the sheave blocks on both sides of the structure, said cable is strung in the following manner:

Said cable leads from a guide pulley 30 at the front of and above the body to a pulley 31 on crossbeam 2. From pulley 31 said cable extends to and about other guide and direction changing pulleys 32 and 33 mounted on one side post 1, the latter pulley being substantially in the transverse plane of the innermost sheave of the block 28 on the corresponding side of the body, and at the bottom being substantially at the same level as the top of said sheave.

The cable extends from pulley 33 to said sheave and then back and forth between the sheaves of the corresponding blocks 28 and 25. From the latter sheave block the cable passes over to the other sheave block 25 on the opposite side of the carriage by way of guide pulleys 34 mounted on top of carriage beams 20 at their rear ends. The cable does not pass directly between said guide pulleys however, but is deflected from a straight line by means of an intermediate guide pulley 35 on the crossbeam 19 of the carriage. The purpose of this is to avoid interference of the crossing cable with the relatively low adjacent portion of the central longitudinal upwardly sloping beam 36 of the scraper framework.

Reaching the last named carriage sheave block 25, the cable extends back and forth between the sheaves of said block 25 and those of the corresponding block 28 to a final anchorage at the latter as shown in Fig. 1. The pulling pressure of the cable is thus distributed evenly to both carriage sheave blocks 25, and as will be seen, in such a manner that said cable never exerts any lifting action on the tailgate or its carriage.

It may here be noted that the cable 29, after passing forwardly about the front pulley 30, does not extend directly to the power hoist or power control unit of the tractor to which the scraper is attached. Instead, said cable is first connected to and actuates the front apron of the scraper in the same manner as shown in said Patent No. 2,112,105. Inasmuch however as said apron in no way affects the cable as far as its control of the tailgate is concerned, it is of course unnecessary to show or describe such apron in this application.

As in the previous structure, the tailgate and sliding bowl move forward as a unit (when loaded) when the pull is first applied to the tailgate. When the bowl 9 has reached its forward limit of movement, and the tailgate continues to advance, latch arms 38 pivoted on the sides of bowl 9 at the rear, automatically engage fixed latch members 39 mounted on the sides of the body, so that the sliding bowl cannot back up until the latches are released. When the tailgate has retracted in the sliding bowl until uprights engage the bowl crossbeam 11, the end uprights have already engaged and moved releasing elements 40 extending upwardly and radially of the arms 38 in a direction to lift said arms clear of the fixed latch elements, or to the position shown in Fig. 1. Backward pressure of the tailgate uprights against beam 11 will thus cause the tailgate and sliding bowl to move back to their fully retracted position as a unit. Such retractive movement is imparted to the tailgate by means of a spring pulled cable 41 applied to the back of the tailgate and actuated as shown herein by the mechanism as set forth in my Patent No. 2,119,335 dated May 31, 1938.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a scraper, a bowl, a tailgate in the bowl, means including guide elements mounting the tailgate in connection with the bowl for movement lengthwise thereof and including a carriage rigid with and from which the tailgate depends and means applied to the carriage on both sides at points below the guide elements rearwardly of the gate and laterally out from the bowl to pull the tailgate forwardly in the bowl.

2. In a scraper, a bowl, a tailgate in the bowl, means mounting the tailgate in connection with the bowl for movement lengthwise thereof and including a carriage rigid with and from which the tailgate depends, arms rigid with and depending from the carriage on both sides rearwardly of the tailgate and outwardly of the bowl to a termination below the mounting means, and means applied to the lower ends of both arms at points rearwardly of the tailgate to pull the carriage and tailgate forwardly.

3. In a scraper, a bowl, a tailgate in the bowl, means mounting the tailgate in connection with the bowl for movement lengthwise thereof and including a carriage rigid with and from which the tailgate depends, arms rigid with and depending from the carriage on both sides and outwardly of the bowl, sheave blocks on the lower ends of the arms, relatively fixed sheave blocks on the scraper ahead of the arm blocks, a pull cable extending first between the sheave blocks on one side of the scraper and then between the blocks on the other side of the scraper, and means to guide the cable laterally of the scraper between corresponding opposite sheave blocks.

4. In a scraper, a bowl, a tailgate in the bowl, means mounting the tailgate in connection with the bowl for movement lengthwise thereof and including a carriage rigid with and from which the tailgate depends, arms rigid with and depending from the carriage on both sides and outwardly of the bowl, sheave blocks on the lower ends of the arms, relatively fixed sheave blocks on the scraper ahead of the arm blocks, a pull cable extending first between the sheave blocks on one side of the scraper and then between the blocks on the other side of the scraper, and direction changing guide pulleys on the carriage engaging the cable in crossing over from one arm sheave block to the other.

5. A structure as in claim 3, in which the initial run of the cable extends rearwardly from ahead of the carriage, there being cable guide means on the scraper to reverse the cable at the rear termination of said initial run and direct the cable thence to one of said relatively fixed sheave blocks.

6. In a telescoping scraper, a framework including a pair of longitudinal vertically spaced rails on each side, side plates inwardly of and against which the rails are secured, a fixed bowl of which the forward portions of the side plates form the side walls, a slidable bowl disposed between the side plates and riding at its forward end on the bottom of the fixed bowl, said slidable bowl including side plates, rollers between and normally engaging the upper faces of the lower rails and roller supporting elements projecting laterally out from the side plates of the slidable bowl; the first named side plates being slotted lengthwise for the reception of said elements.

7. A structure as in claim 6 in which said rollers are disposed adjacent the rear end of the side plates of the sliding bowl.

8. In a scraper, a bowl, a tailgate in the bowl, a relatively long carriage mounted on the bowl for movement lengthwise thereof and from intermediate the ends of which the tailgate depends in rigid relationship, arms depending from the carriage at its rear end and means applied to the arms at their lower end to pull the carriage forwardly.

9. In a scraper, a bowl, a tailgate in the bowl, a carriage mounted on the bowl for movement lengthwise thereof and from which the tailgate depends in rigid relationship, arms rigid with the carriage and depending therefrom rearwardly of the tailgate to a point a predetermined distance below the carriage, and means applied to the arms at their lower end to pull the carriage forwardly.

ROBERT G. LE TOURNEAU.